C. NILL.
SHAFT PACKING.
APPLICATION FILED FEB. 5, 1914.
1,124,641.
Patented Jan. 12, 1915.
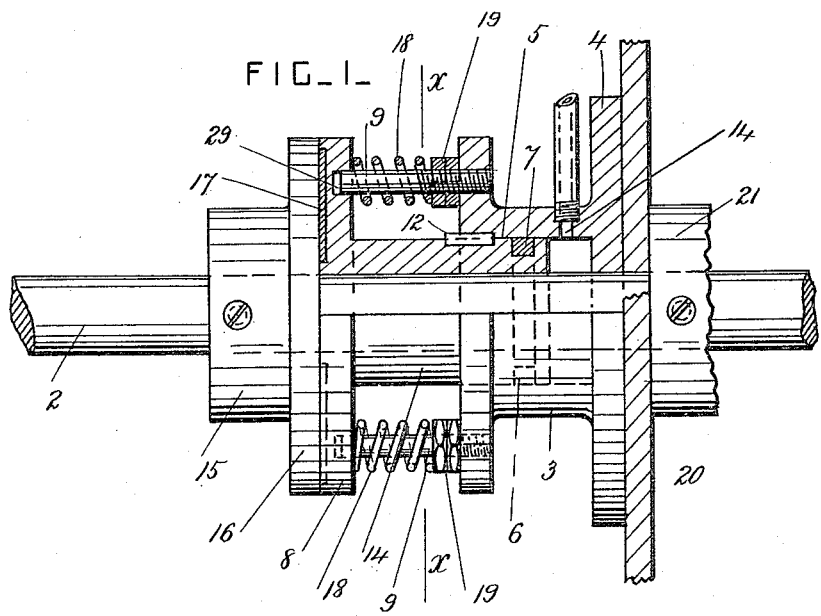
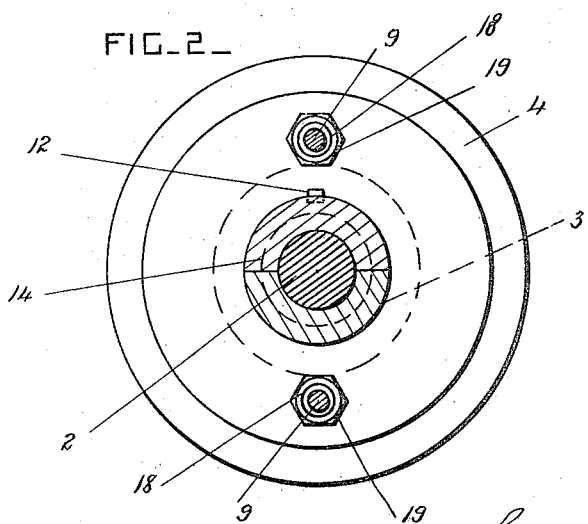

UNITED STATES PATENT OFFICE.

CONRAD NILL, OF ERIE, PENNSYLVANIA.

SHAFT-PACKING.

1,124,641.

Specification of Letters Patent.

Patented Jan. 12, 1915.

Application filed February 5, 1914. Serial No. 816,697.

*To all whom it may concern:*

Be it known that I, CONRAD NILL, a citizen of the United States, residing at Erie, in the county of Erie and State of Pennsylvania, have invented certain new and useful Improvements in Shaft-Packing; and I do hereby declare the following to be a full, clear, and exact description of the invention, such as will enable others skilled in the art to which it appertains to make and use the same.

This invention relates to packing for revolving shafts and more particularly for pump shafts; and it consists in the novel construction and combination of the parts hereinafter fully described and claimed.

In the drawings, Figure 1 is a side view of a shaft provided with packing according to this invention, and showing the packing partially in section. Fig. 2 is a cross-section through the packing, taken on the line $x$—$x$ in Fig. 1.

The shaft 2 is the revolving shaft of a pump or any other similar machine. This shaft 2 projects through a packing box 3 which is secured to or cast on one side of the pump chamber. When bolted to the pump chamber it is provided with a flange 4 for the bolts to pass through.

A packing gland 14 is arranged in the cylindrical chamber 5 of the packing box 3. The end portion of the gland, inside the chamber, has a circumferential groove 6, and 7 is a ring of india rubber, or other similar packing material, inserted in the groove 6 and forming a watertight joint around the outside of the gland.

The gland 14 has an external flange 8, and 9 are studs screwed into the packing box at one end, and engaging slidably with holes or recesses 29 in the flange 8 at the other end. The gland is free to slide longitudinally on the shaft, but it is prevented from revolving with the shaft by any approved means. The studs 9 afford one means for preventing the gland from revolving, and the gland may be splined to the packing box by a feather key 12 as another means, or as an additional means. The packing chamber has a small hole 14 for the introduction of water or other fluid into it through a suitable pipe.

A collar 15 is rigidly secured on the shaft 2, and has a flange 16 which bears against the flange 8 of the gland. The gland is preferably formed of two longitudinal halves or sections, arranged side by side, so that it can be removed from the shaft and renewed as often as necessary. One of the flanges, and preferably the flange 8, is provided with a facing or filling 17 of antifriction material, such as graphite, and a watertight joint is formed between the opposed bearing surfaces of the two flanges.

Helical springs 18 are arranged around the studs 9, and nuts 19 are screwed on the studs, to adjust the pressure of the springs on the back of the flange 8 of the gland. The shaft is prevented from sliding outwardly of the pump chamber 20 by a collar or hub 21 inside the pump chamber, or by any other approved means.

What I claim is:

1. The combination, with a revoluble shaft, and a collar secured thereon and provided with a bearing flange; of a stationary packing box encircling the shaft, a non-revoluble gland slidable longitudinally and watertight in the packing box and provided with a bearing flange at its outer end, and means for holding the flange of the gland in watertight relation with the flange of the collar.

2. The combination, with a revoluble shaft, and a collar secured thereon and provided with a bearing flange; of a stationary packing box encircling the shaft, a gland slidable longitudinally and watertight in the packing box and provided with a bearing flange at its outer end which has recesses in it, studs secured to the packing box and engaging with the said recesses and preventing the gland from revolving, and helical springs encircling the studs and operating to hold the flange of the gland in watertight relation with the flange of the collar.

3. The combination, with a revoluble shaft, and a collar secured thereon and provided with a bearing flange; of a stationary packing box encircling the shaft, a non-revoluble gland formed of sections arranged side by side and slidable longitudinally and watertight in the packing box and provided with a bearing flange at its outer end, and springs arranged between the packing box and the flange of the gland and holding the said flange in watertight relation with the flange of the collar.

4. The combination, with a chamber, a packing box secured to the chamber at one end, and a shaft projecting from the chamber and through the packing box; of abutments secured on the shaft inside and outside the chamber and preventing it from sliding longitudinally, a non-revoluble gland free to slide longitudinally on the shaft and engaging with the packing box, means for forming a watertight joint between the outer end of the gland and the outer abutment, and means for introducing fluid to the packing box behind the inner end of the gland.

In testimony whereof I have affixed my signature in the presence of two witnesses.

CONRAD NILL.

Witnesses:
M. V. BROOKS,
F. W. ABIERMANN.

Copies of this patent may be obtained for five cents each, by addressing the "Commissioner of Patents, Washington, D. C."